United States Patent
Wang-Knop et al.

(10) Patent No.: US 6,915,391 B2
(45) Date of Patent: Jul. 5, 2005

(54) SUPPORT FOR SINGLE-NODE QUORUM IN A TWO-NODE NODESET FOR A SHARED DISK PARALLEL FILE SYSTEM

(75) Inventors: Kuei-Yu Wang-Knop, Poughkeepsie, NY (US); Robert J. Curran, West Hurley, NY (US); Radha R. Kandadai, Lake Katrine, NY (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 09/737,393

(22) Filed: Dec. 15, 2000

(65) Prior Publication Data

US 2002/0078312 A1 Jun. 20, 2002

(51) Int. Cl.[7] ............................................. G06F 12/00
(52) U.S. Cl. .................... 711/150; 711/147; 711/148; 711/152; 713/200; 713/202; 713/201; 713/153; 714/100
(58) Field of Search .......................... 711/147, 148, 711/150, 151, 152, 153, 154, 161, 162; 713/200, 201, 100, 153, 202; 714/1, 2, 3, 7, 8, 5, 100; 710/240

(56) References Cited

U.S. PATENT DOCUMENTS

| | | | |
|---|---|---|---|
| 5,459,857 A | 10/1995 | Ludlam et al. | 395/182.04 |
| 5,504,861 A | 4/1996 | Crockett et al. | 395/182.11 |
| 5,673,384 A | 9/1997 | Hepner et al. | 395/182.09 |
| 5,682,470 A | 10/1997 | Dwork et al. | 395/182.1 |
| 5,727,206 A * | 3/1998 | Fish et al. | 395/618 |
| 5,740,348 A | 4/1998 | Cunliffe et al. | 395/182.04 |
| 5,828,889 A * | 10/1998 | Moiin et al. | 714/4 |
| 5,917,998 A | 6/1999 | Cabrera et al. | 395/182.04 |
| 5,941,999 A | 8/1999 | Matena et al. | 714/714.06 |
| 5,948,109 A * | 9/1999 | Moiin et al. | 714/4 |
| 5,978,933 A | 11/1999 | Wyld et al. | 714/13 |
| 5,996,075 A * | 11/1999 | Matena et al. | 713/200 |
| 6,021,508 A * | 2/2000 | Schmuck et al. | 714/4 |
| 6,349,392 B1 * | 2/2002 | Swoboda et al. | 714/30 |

* cited by examiner

Primary Examiner—Kimberly McLean-Mayo
(74) Attorney, Agent, or Firm—Lawrence D. Cutter

(57) ABSTRACT

A method is provided for continuing node operations in quorum-based protocols. This is particularly valuable in the situation in which a group of nodes includes only two nodes and in which communications to a node is lost. Provision is made for adding additional status indications to each node indicating whether or not it is enabled for single-node quorum operation. Provision is also made for identifying one node as a primary node and another node as a secondary node for time-out response purposes.

4 Claims, 3 Drawing Sheets

SUPPORT FOR SINGLE-NODE QUORUM IN A TWO-NODE NODESET FOR A SHARED DISK PARALLEL FILE SYSTEM

BACKGROUND OF THE INVENTION

The present invention is generally directed to a method for controlling access to data in a shared disk parallel file data processing system. More particularly, the invention is directed to a method which prevents system shutdown in a two-node quorum based system which would otherwise occur as a result of a communications failure between nodes which prevents coordinated data access.

Shared disk file systems allow concurrent shared access to data contained on disks attached by storage area networks (SAN). SANs provide physical level access to data on the disk to a number of systems. The shared disks are split into partitions which provide a shared pool of physical storage without common access or, with the aid of a shared disk file system or database manager, coherent access to all the data from all of the systems is provided by SAN. IBM's GPFS (General Parallel File System) is a file system which manages a pool of disks and disk partitions across a number of systems allowing high speed direct access from any system and which provides aggregate performance across a single file system which exceeds that available from any file system managed from a single system. The present invention addresses an aspect of bringing such multi-system power to bear on aspects of file system operation.

In the GPFS shared disk file system each node (each with one or more processors) has independent access to the disk, and data and metadata consistency is maintained through the use of a distributed lock manager (or token manager). This requires that all participating nodes be capable of communicating and participating in a locking protocol. A node which is not capable of participating in a locking protocol must not access data and there must be mechanisms for other nodes to reclaim control of metadata being modified at nodes which have failed or which have lost the capability of internode communication. GPFS provides such capabilities in clusters of three or more nodes using a quorum mechanism. There is a desire for the capability of sharing data among two nodes if the two nodes satisfy certain operational requirements. It is also desirable that one node be able to continue operation in the event of the failure of the other or in the event that network communications between the two nodes is lost. For more background information see "Parallel File System and Method for Independent Metadata Loggin" (U.S. Pat. No. 6,021,508 issued Feb. 1, 2000).

The concept of a quorum of nodes is part of the existing GPFS recovery model that avoids multiple instances of the token manager handing out tokens for the same objects or making conflicting locking decisions. GPFS currently requires a quorum of nodes (usually, one plus half of the number of nodes in the GPFS nodeset) to be active as a member of a group before any data access operations can be honored. This requirement guarantees that a valid single token management domain exists for each GPFS file system. Prior to the existence of a quorum, most requests are rejected with a message indicating that quorum does not exist. If an existing quorum is lost, GPFS exits all nodes to protect the integrity of the data.

In a two node system, the multi-node quorum requirement is two, meaning that both participating nodes must be members of the group before the GPFS file system operation is honored. In order to relax this requirement so that operations are allowed when a single node is available, GPFS provides support for single-node quorum operation in a two node nodeset. The main issue of single node quorum operation in a two-node nodeset is the assurance that there is only one lock manager (i.e., only one token management domain) for the shared disk file system, so that data consistency and integrity is protected.

A simple way of doing this is through the creation of a third (tie breaker) node which referees situations where one node appears to be down. This is easy to implement but then a quorum requires both nodes or one node plus the tie breaker node. It does not solve a true two-node nodeset problem where there is not a third node available.

The solution described herein modifies existing quorum behavior for three-node or greater nodesets to support single-node quorum behavior in a two node nodeset. It meets the desired objective of allowing either node to fail while still permitting the other node to continue accessing data in the file system.

There are only two methods which are used for solving the need to share data. One is a quorum of some type similar to the basic GPFS design. The other method is an approach where one node is designated as "privileged" and any group which contains this node can continue. This second method creates either a single point of failure for the entire cluster of nodes which shares the data, or a requirement for manual intervention to move the privileged node and keep track of the movement in some highly available storage. The present invention avoids all of these problems.

SUMMARY OF THE INVENTION

In accordance with one embodiment of the present invention, a method for controlling access to data in a shared disk parallel file system comprises a first step of determining, in a two-node system, whether or not communications to one node has failed. A determination is then made by the unaffected node as to whether or not the node has been enabled for single-node quorum operation. If single-node quorum operation has been determined to have been enabled, data access to the affected node is fenced. This mode of operation permits continual operation of the remaining system node and avoids shutting down the entire system to address the communications failure problem.

Accordingly, it is an object of the present invention to ensure data processing system availability.

It is yet another object of the present invention to ensure data integrity and consistency of all related data files in a shared disk parallel file system.

It is also another object of the present invention to provide continued access to data in a quorum-based access protocol.

It is a still further object of the present invention to expand the operating time and characteristics of multi-node computer systems particularly those in which an identified group of two nodes access the same data and data files.

It is also an object of the present invention to provide a mode of useful operation for nodes which have been isolated due to communications failure.

It is yet another object of the present invention to provide continued operation of an isolated node so that problems associated with communications failures can be addressed at more convenient times.

Lastly, but not limited hereto, it is yet another object of the present invention to provide a new state for nodes in a group which permits, as desired, operation of a single node in a quorum protocol for data access.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

A full understanding of the operation of the present invention is best achieved by first considering certain background information which assists in better understanding the context in which the invention functions. File system 220 is a computer program that allows other application programs to store and retrieve data on media such as disk drive 150. A file is a named data object of arbitrary size. The file system allows application programs to create files and give them names, to store data into them (or write), to read data from them, to delete from them and to perform other operations on them. File structure 160 is the organization of data on the disk drives.

A shared disk file system is one in which file structure 160 residing on one or more disks is accessed by multiple file systems running on separate computers (or nodes 100). A shared disk file system allows a computation that uses the file structure to be broken up into multiple pieces that can be run in parallel on multiple nodes.

Figure 1:
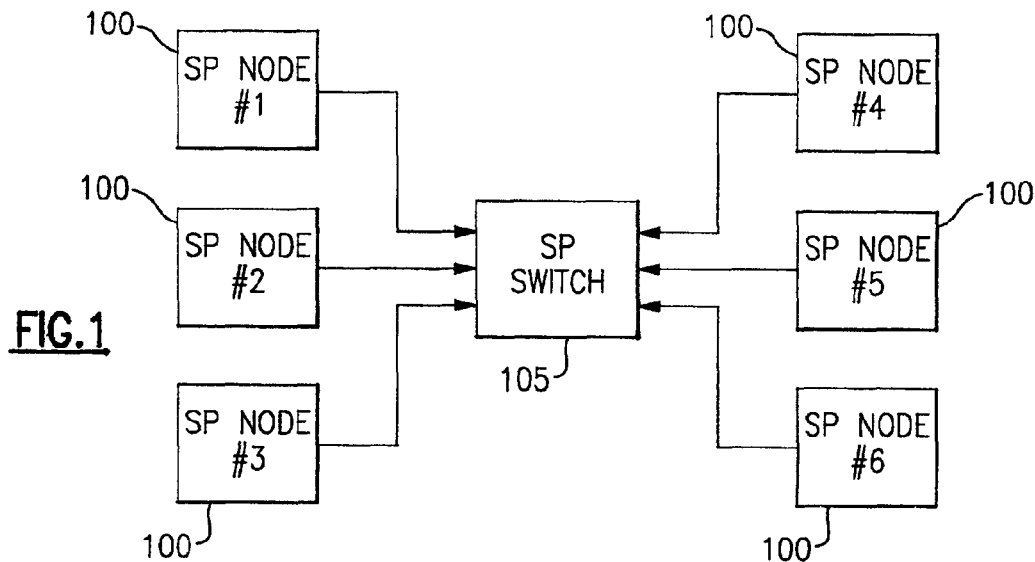
FIG. 1 is a block diagram illustrating a multi-node system connected by a communications switch.
Figure 2:
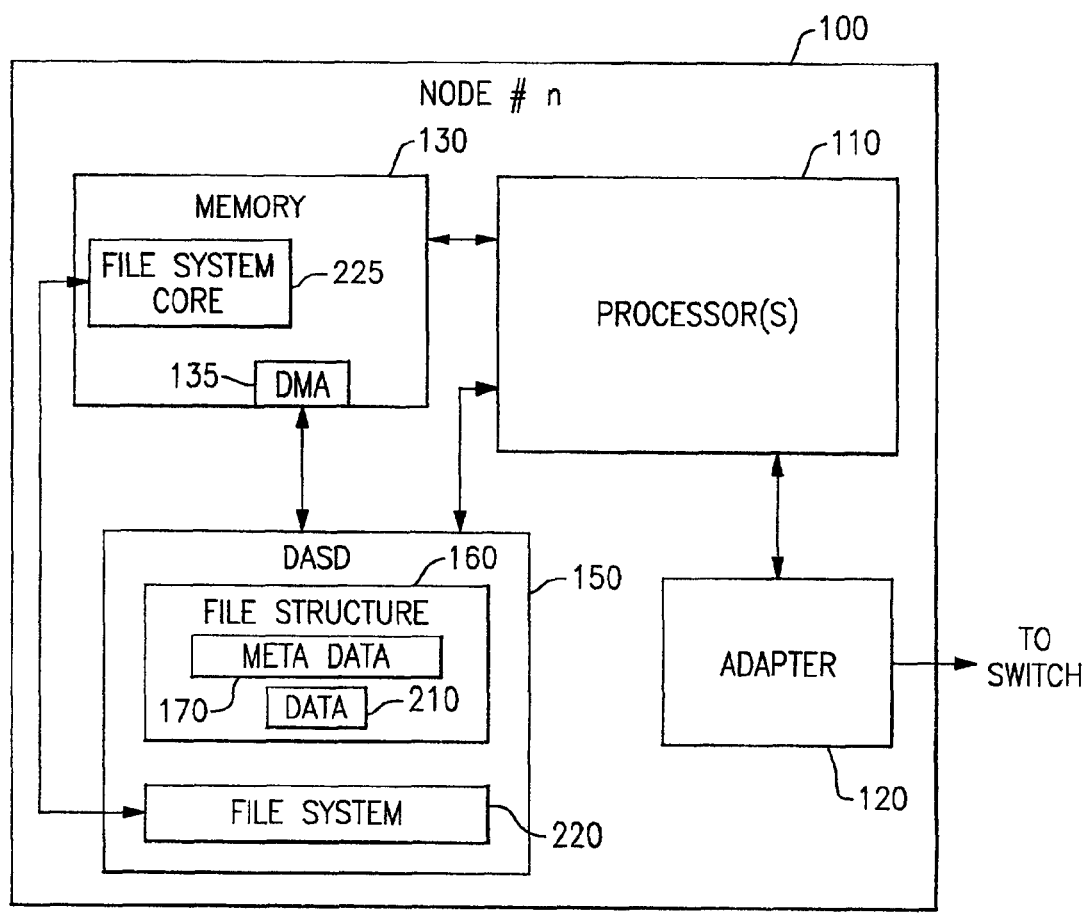
FIG. 2 is a block diagram illustrating the internal structure of one node in a multi-node data processing system.
Figure 3:
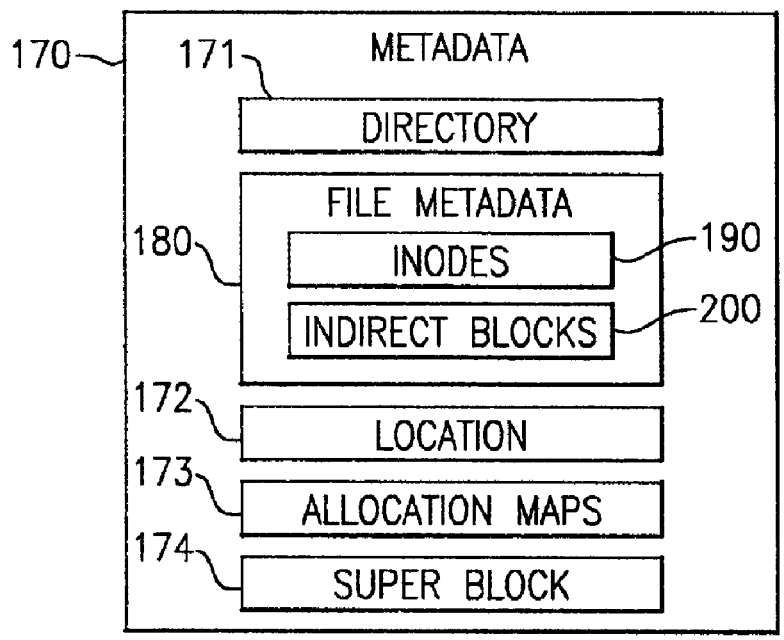
FIG. 3 is a block diagram illustrating the metadata data structure.

In addition to the file data itself, file structure 160 contains metadata 170: such as directory 171 that maps file names to the corresponding files, file metadata 180 (including inodes 190 and indirect blocks 200) that contains information about the files and, most importantly contain the location of the file data on disk (i.e. which disk blocks hold the file data), allocation map 173 that records which disk blocks are currently in use to store metadata and file data, and superblock 174 that contains overall information about the file structure (e.g. the locations of the directory, allocation map, and other metadata structures). See FIG. 3.

Figure 4:
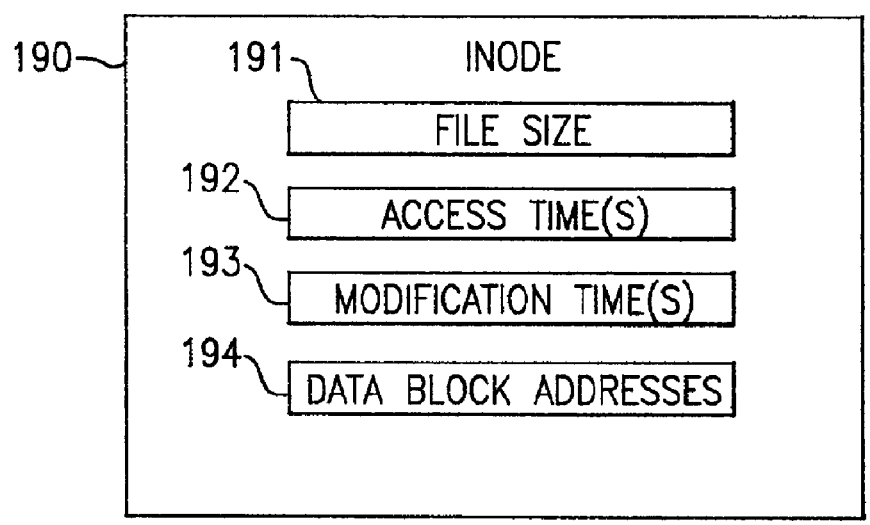
FIG. 4 is a block diagram illustrating the inode data structure.

The file system in preferred embodiment of the present invention is GPFS General Parallel File System for AIX. GPFS allows shared access to files that may span multiple disk drives on multiple RS/6000 computers. Metadata updates are handled in the following fashion. Nodes read and write to different areas of the file if they first present an appropriate lock for the sections which they are reading from or writing to, but all of the nodes need to access the same metadata 170. Metadata includes file size 191, file access times 192 and file modification times 193 and the addresses of the file's data blocks 194. See FIG. 4. In GPFS there is the construct of a metadata node (or metanode) that is used for managing file metadata for parallel read and write in a shared-disk environment. For each file, a single node is selected as the metanode for that file. The metanode keeps the information about the file's metadata and is responsible for handling all of the I/O activity of metadata to and from the disk (or disks) 150 on which the metadata reside. All of the other nodes communicate with the metanode in order to fetch or update metadata information. However, these nodes do not directly access metadata information on the disk. This prevents a considerable amount of disk activity which could be a considerable performance improvement for a parallel file system. Write Sharing occurs in the following manner. In particular, GPFS provides fine-grain write sharing support so that as long as two operations update disjoint byte ranges of a file, they are allowed to proceed in parallel.

Figure 5:
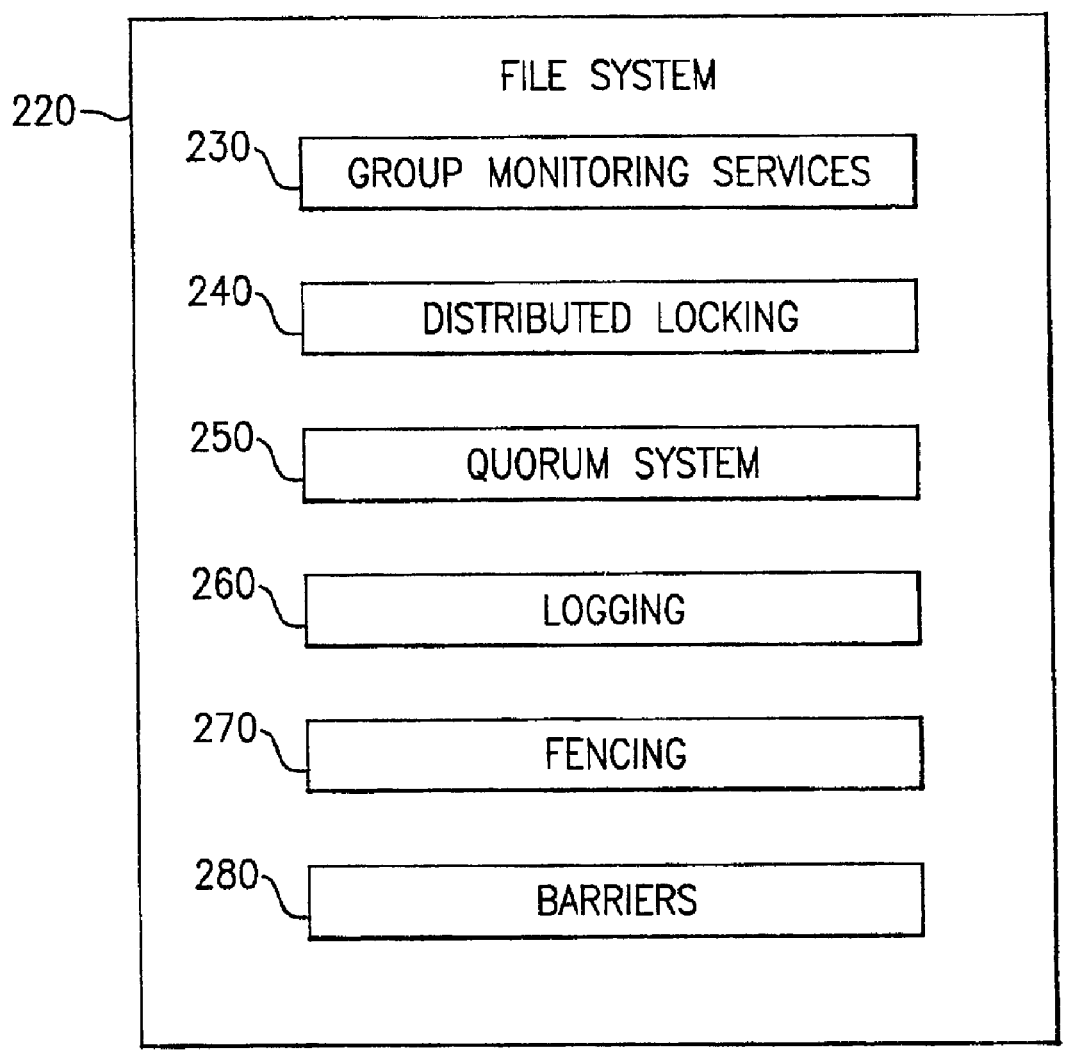
FIG. 5 is a block diagram illustrating file system components.

The GPFS recovery model 220 implements the following concepts (see FIG. 5). A group monitoring service 230 (like the IBM RS/6000 Cluster Technology (RSCT) group services) monitors processes on all of the nodes and detects node and communication failures. This service is provided by joining "process groups"; all members of a group are informed when a member fails or when a new process attempts to join a group. During start time, all nodes are forced to join the process group. All disk access is coordinated among group members through distributed locking 240 in which a member obtains a lock before reading or changing a particular piece of data and/or metadata on a shared disk. One member of the group is a lock manager; the lock manager knows which locks are held on which node. Failover capabilities exist which allow the movement of the lock manager to a surviving node which continues to be effective even in the two node scenario of concern herein.

The quorum state is tracked by the group monitoring services (IBM RSCT group services, e.g.). When a node joins a GPFS group, if there is no quorum yet, the group state is set to INITIAL. When there are enough nodes in the group so that the quorum requirement is met, the group state changes to ACTIVE state. A GPFS node can serve data when it is in the ACTIVE state. When a node has failed its state is set to FAILED and all of the surviving nodes terminate communication to it. The File System Manager fences the failed node that causes the disk subsystem to cease to honor disk requests from the failed node. The failed node is not able to access the shared disks, even if it has not yet detected the communication failure.

Consideration is now specifically given to the use of quorum 250 operations, particularly as they are implemented in GPFS. There is one Configuration Manager per nodeset. The Configuration Manager selects the File System Manager node and determines whether or not a quorum of nodes exist. A quorum of nodes is the minimum number of nodes in the file system (GPFS) nodeset which must be running in order for the file system daemon to start and for file system operations usage to continue. Quorum is enforced within a nodeset to prevent multiple nodes from assuming the role of File System Manager. Multiple nodes assuming this role could pose potential data corruption problems since the token management function usually resides on the File System Manager node.

The quorum state is tracked by the group monitoring services (IBM RSCT group services, e.g.). When a node joins a GPFS group, if there is no quorum yet, the group state is set to INITIAL. When there are enough nodes in the group so that the quorum requirement is met, the group state changes to ACTIVE state. A GPFS node can serve data when it is in the ACTIVE state. When a node has failed its state is set to FAILED and all of the surviving nodes terminate communication to it. The File System Manager fences the failed node that causes the disk subsystem to cease to honor disk requests from the failed node. The failed node is not be able to access the shared disks, even if it has not yet detected the communication failure.

Attention is now directed to the specific details of the present invention as they particularly relate to scenarios resulting in a single-node nodeset operating with quorum functions enabled. GPFS enforces a quorum within a nodeset to prevent the possibility that two nodes both act as the token server for a file system with the resultant occurrence of data corruption. The quorum is enforced without change for all nodesets having three nodes or more. In a two-node nodeset, there is provided herein an option of allowing multi-node quorum or single-node quorum operations. The selection of single-node quorum behavior allows the remaining node in a two-node nodeset to continue functioning even in the event of the failure of the peer node.

If multi-node quorum operations are in force, then a quorum needs to be maintained in order to recover failing nodes. If multi-node quorum operations are not maintained due to node failure, all GPFS nodes are restarted, handle recovery and then attempt to again achieve quorum operation status. Therefore, in a three-node system, failure of one node allows recovery and continued operation on the two remaining nodes. This is generally the minimum configuration where continued operation is possible due to the failure of a node. That is, in a two-node system where a single-node quorum operational status has not been enabled, the failure of one node means that both nodes restart, handle recovery, and again attempt to achieve quorum. Here failure does not necessarily mean failure of an entire node but can simply mean the failure of a communications link to the node.

However, if single-node quorum operations are enabled, then the failure of one node causes GPFS to fence the failing node. The objective is that only one node continues operation and the second node resumes operation only when recovery has been completed and both nodes can cooperate. The remaining node continues processing as long as the fencing operation is successful.

In single-node quorum operation, a node serves data when its group state is either ACTIVE or SINGLENODE. Previous systems have not employed the possibility of having a SINGLENODE state. Behavior with both nodes available is unchanged. Behavior with only one node available now depends on how the problem arose. If group monitoring services 230 report failure of a member of the GPFS group, GPFS starts a protocol to change the state of the group to SINGLENODE. When that protocol succeeds, it fences the other node and continues. The transition to ACTIVE state from SINGLENODE state occurs when the other GPFS returns. This situation covers failure of GPFS software where there is communication with other software on the failed node. In preferred embodiments of the present invention, one of the nodes in the nodeset is designated as the primary node and the other is designated as the secondary node. If the group monitoring services 230 reports the failure of a member of the GPFS group which includes the failure of the node, GPFS proposes a state change to SINGLENODE on the primary node which succeeds. The primary node then fences the secondary node and continues as long the fencing operations succeed. If some operations succeed but others fail, the file systems which could not be completely fenced are unmounted. The secondary node waits for a period of time (say, 3 minutes, which is preferably a selectable arbitrary number) and then determines if it has been fenced. The check on fencing is done in the same order on both nodes so that a consistent determination is made. The delay on the secondary node prevents the case where a series of communications paths have failed but both nodes are really up and each is operating to fence both nodes so that no one gets served. If the secondary node is fenced, it unmounts all file systems and waits for the availability of the communications needed to resume two-node operation. If it is not fenced, it assumes the primary role described above and fences the other node. There is a small window of time which occurs if the primary is delayed for exactly the same wait time when both nodes are fenced, but that probability is extremely small.

When GPFS starts on a node it normally waits for a quorum. If single-node behavior is allowed, it times out the wait after three minutes. If GPFS is not fenced on any of its file systems which are to be auto mounted, it fences the other node and proceeds to operate in SINGLENODE mode. If it is fenced, it waits for a quorum. This provides the system administrator with a method of bringing up one node if the communications paths are down. The administrator can manually unfence one of the nodes and restart GPFS. Fencing is normally cleared if both nodes come up.

When GPFS is started on a node, it only unfences itself if it can form a two node group. That means that a start of GPFS either requires that both nodes be available or requires that the node has previously been unfenced. If it comes up, finds no partner and is unfenced, it delays a period of time, fence the other node and start single node operation. Instead of the three states in the multi-node quorum behavior: INITIAL, ACTIVE and FAILED, a new group state, SINGLENODE, is added to support single-node quorum operations. In multi-node quorum operations, a node can safely serve data when it is in the ACTIVE state, whereas in single-node quorum operations, a node can serve data in both the ACTIVE state (both nodes available) and in the SINGLENODE state (only one node available). In single-node quorum operations, the two node nodeset enters an INITIAL state when the nodes first join the group. If a quorum is achieved within the pre-defined delay, the state transitions to the ACTIVE state, otherwise the SINGLENODE state is attempted.

A node successfully transits from the ACTIVE state (in the event of losing the partner node) or to the INITIAL state (after initial time out) to the SINGLENODE state if it is able to fence the partner node from accessing the disks. A node state changes from ACTIVE to FAILED if it exits the GPFS group (voluntarily or due to some failure) and changes from SINGLENODE to FAILED if it is unable to implement the single-node quorum protocol failing in fencing the partner node. A node also goes from SINGLENODE state to ACTIVE state when the partner node has successfully joined the group.

In a two-node nodeset, the participant nodes have distinct roles. One node is designated as the primary and the other is designated as the secondary node. This designation allows the implementation of differentiated delays for each node if both nodes try to fence each other. The primary node fences the partner node immediately after realizing that the other node is unreachable (via group services notification or communication time-out) whereas the secondary node delays for a period of time before attempting to fence the partner.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for controlling access to data in a shared disk parallel data file, said method comprising the steps of:

determining, in a two-node system, that communications to one node has failed;

determining whether or not the node that has not failed has been enabled for single-node quorum operation; and upon detection of single node enablement status, fencing data access to and from said failed node.

2. The method of claim 1 in which, between said determination steps, a file status indicator for said non-affected node is switched so as to indicate single-node operation.

3. The method of claim 1 in which said two nodes are separately indicated as being the primary and secondary node, and wherein when said secondary node detects that it has been isolated, said secondary node waits for a predetermined period of time and then sets a data bit indicating that it has been fenced.

4. The method of claim 3 in which, upon setting of said data bit which indicates that said secondary node has been fenced, said secondary node then unmounts all file systems and waits for a signal indicating that two-node operation is possible.

* * * * *